United States Patent
Lim et al.

(10) Patent No.: US 7,904,433 B2
(45) Date of Patent: Mar. 8, 2011

(54) APPARATUS AND METHODS FOR PERFORMING A RULE MATCHING

(75) Inventors: Mengguan Lim, Singapore (SG); Jongkwee Foo, Singapore (SG)

(73) Assignee: O2Micro International Limited, Grand Cayman (KY)

(*) Notice: Subject to any disclaimer, the term of this patent is extended or adjusted under 35 U.S.C. 154(b) by 408 days.

(21) Appl. No.: 11/973,817

(22) Filed: Oct. 9, 2007

(65) Prior Publication Data

US 2009/0094226 A1 Apr. 9, 2009

(51) Int. Cl.
*G06F 17/30* (2006.01)
(52) U.S. Cl. .......... 707/697; 707/698; 707/699
(58) Field of Classification Search .......... 707/697, 707/698, 699, 999.003
See application file for complete search history.

(56) References Cited

U.S. PATENT DOCUMENTS

| | | | | |
|---|---|---|---|---|
| 6,799,199 | B1* | 9/2004 | Segal et al. | 709/207 |
| 7,324,990 | B2* | 1/2008 | Jaschek et al. | 707/5 |
| 7,587,487 | B1* | 9/2009 | Gunturu | 709/224 |
| 2009/0283583 | A1* | 11/2009 | Cowburn et al. | 235/375 |
| 2009/0307112 | A1* | 12/2009 | Cowburn et al. | 705/28 |

* cited by examiner

*Primary Examiner* — Jean M Corrielus

(57) ABSTRACT

Apparatus and methods for performing a rule matching are disclosed. In one embodiment, an apparatus for performing a rule matching includes a content matching module and a first rule matching module. The content matching module searches the data stream for contents. The contents are organized into rules including a simple rule with a single content and a complex rule with multiple contents. The first rules matching module is coupled to the content matching module for determining whether the rules are matched by the data stream according to a searching result of the content matching module. To this end, the first rule matching module updates status registers according to the searching result and each status register can indicate whether one of the rules is matched by the data stream.

27 Claims, 4 Drawing Sheets

APPARATUS AND METHODS FOR PERFORMING A RULE MATCHING

TECHNICAL FIELD

The present invention relates to data processing, in particular data filtering.

BACKGROUND ART

Computer systems now operate in an environment of near ubiquitous connectivity, whether coupled to the internet and networks by wire or via wireless technology. While the availability of online communication has created countless new opportunities for web based businesses and information sharing, there has also been an increase in the frequency of attempted breaches of network security, or hacker attacks, intended to access confidential information or to otherwise interfere with network communications.

Recently, a number of applications aimed at detecting and thwarting attacks in the network have emerged, including anti-virus data filtering, firewalling, intrusion detection/prevention and network protection. At the heart of almost every modern network security system is a content matching engine that scans an input data stream for specific contents that are of known suspicious, threatening or dangerous data. The content matching engine is also known as a pattern matching engine, and the specific contents (patterns) scanned for are usually called the content (pattern) signature residing in a signature database. In the event a match is found between the scanned data stream and a content signature in the signature database, an alert or alarm may be issued, and furthermore the scanned data stream may be captured before any damage is done. Besides implementation in network security applications, content matching is also used in internet protocol (IP) routing where each data stream traversing the router is retrieved to find its IP destination.

One implementation of the content matching engine utilizes a processor (CPU/NPU). In operation, the contents of the signature database are stored in an external static random access memory (SRAM) or a dynamic random access memory (DRAM). Software run by the processor compares the input data stream with the contents in the signature database to perform the content matching function. Because the processor (CPU/NPU) is not specialized to perform the content matching, the matching speed of this processor-based implementation is quite low.

Another implementation of the content matching engine utilizes content addressable memory (CAM) or ternary content addressable memory (TCAM). The CAM (TCAM) is a storage device that is particularly suitable for matching functions. However, the CAM (TCAM) is a very expensive memory component which typically costs five times as much as SRAM. Furthermore, the memory size of the CAM (TCAM) is typically small and cannot scale well with increased contents in the signature database.

Another implementation of the content matching engine utilizes a field reprogrammable gate array (FRGA). In operation, the contents in the signature database are converted into state diagrams and implemented as state machines in the FRGA. The FRGA is programmed to scan the input data stream for the contents in the signature database which have been converted into the state diagrams in the FRGA. However, once the contents in the signature database are modified, the FRGA has to be reconfigured accordingly. Generally, such reconfiguration takes a lot of time such that the flexibility of the FRGA implementation is affected.

To summarize, the implementations discussed above have various drawbacks.

SUMMARY

Apparatuses and methods for performing a rule matching on a data stream are disclosed. In one embodiment, an apparatus includes a content matching module and a first rule matching module. The content matching module searches the data stream for contents. The contents are organized into rules including a simple rule with a single content and a complex rule with multiple contents. The first rules matching module is for determining whether the rules are matched by the data stream according to a searching result of the content matching module. To this end, the first rule matching module updates status registers according to the searching result and each status register can indicate whether one of the rules is matched by the data stream.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Reference will now be made in detail to embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
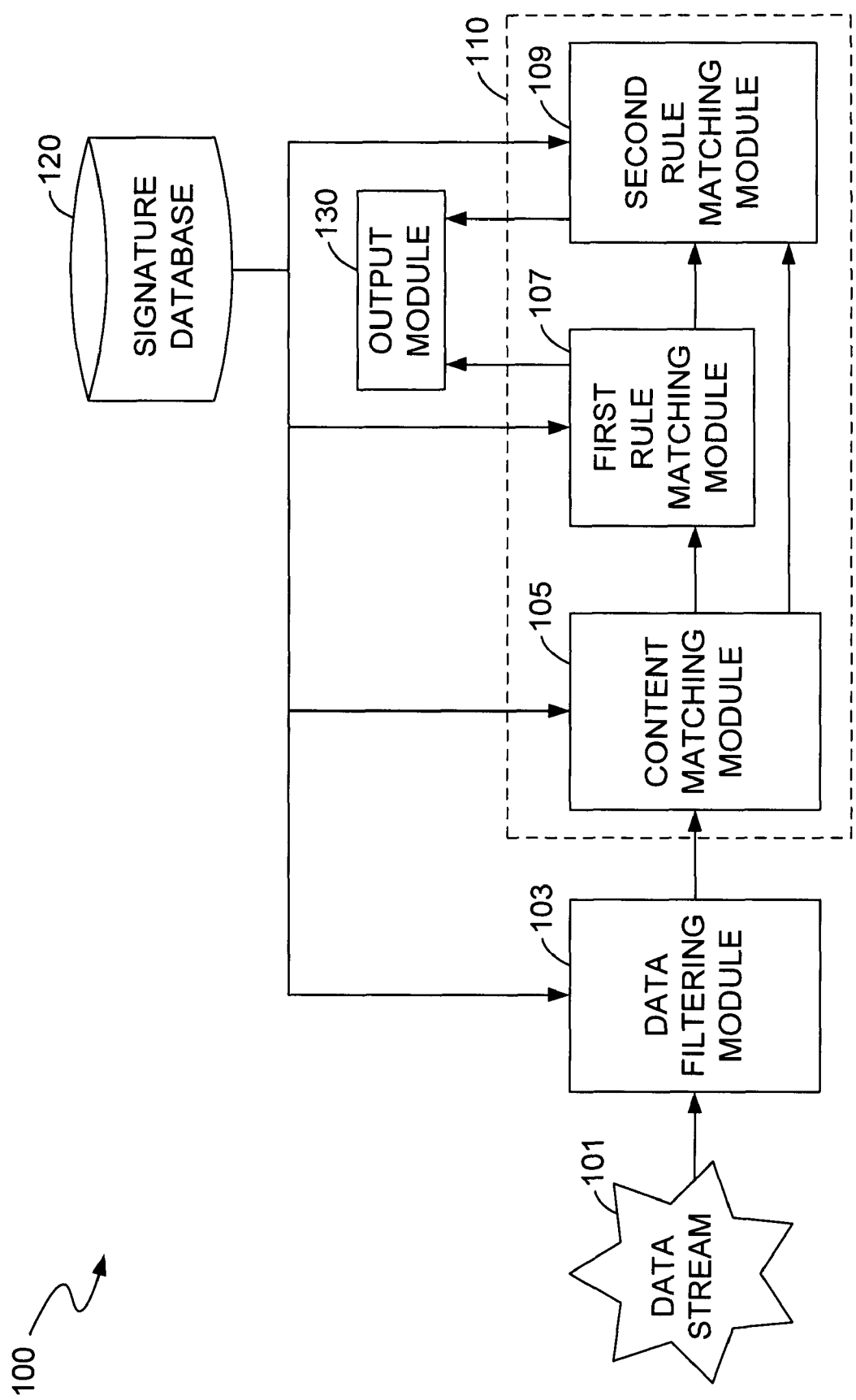
FIG. 1 is a block diagram of a rule matching system according to one embodiment of the present invention.

FIG. 1 illustrates a block diagram of a rule matching system 100 according to one embodiment of the present invention. The system 100 includes a matching engine 110 and a signature database 120. The signature database 120 resides in a memory component, e.g., SRAM or DRAM, and includes contents that are further organized into rules, which may include a simple rule with a single content and a complex rule with multiple contents. The matching engine 110 scans a data stream 101 for the rules in the signature database 120. In one embodiment, to speed up the rule matching, a data filtering module 103 can be coupled between the data stream 101 and the matching engine 110. An output module 130 can also be coupled to the matching engine 110 for providing an alert or alarm when a match is found between the data stream 101 and the rules in the signature database 120. In one embodiment, the matching engine 110 can further include a content matching module 105, a first rule matching module 107 and a second rule matching module 109.

The data filtering module 103 filters the data stream 101 such that only data that have the possibility of matching the rules in the signature database 120 are outputted to the matching engine 110 for further inspection. As such, the processing speed of the system 100 can be increased significantly. In one embodiment, the data filtering module 103 can search the data stream 101 for string portions of the rules in the signature database 120 and only data including the string portions are outputted for further inspection. For example, a first rule in the signature database 120 includes the string "hinthint" followed by "virusvirusvirus" and a second rule in the signature database 120 includes the string "playplay" followed by "basketbasketbasket". Instead of searching the data stream 101 for the entire strings of these rules, e.g., "hinthintvirusvirusvirus" and "playplaybasketbasketbasket", the data filtering module 103 searches for string portions, e.g., "hinthint" and "playplay", and only data including "hinthint" or "playplay" in the data stream 101 are outputted to the matching engine 110 for further inspection.

To further speed up the processing speed of the system 100, string portions may be compressed to the same shorter string portion using a compression algorithm, e.g., hashing. For example, 8-byte string portions including "hinthint" and "playplay" can be hashed to the same 3-byte string portion, e.g., "abc". In this instance, the data filtering module 103 first searches the data stream 101 for the 3-byte hashed string portion "abc"; if the hashed string portion "abc" is found in the data stream 101, the 8-byte string portions decompressed from "abc", e.g., "hinthint" and "playplay", are further searched for byte by byte in the data stream 101. In this way, the filtering speed of the data filtering module 103 is further increased such that the system 100 achieves a further increased processing speed.

The content matching module 105 searches filtered data from the data filtering module 201 for the contents in the signature database 120, and only those contents found in the filtered data are outputted to the first rule matching module 107. In one embodiment, each unique content in the signature database 120 is tagged with a unique content identifier (CID) and the CIDs of the contents found in the filtered data are reported to the first rule matching module 107 for easy sorting. For example, the signature database 120 includes the contents "abcdefg", "bla-bla-bla-bla", "hkejljmoetp", "1234554321 abcde", "leddisplay", "vpnfirewall", "batterycoolcharging", etc. The contents "abcdefg", "bla-bla-bla-bla", "hkejljmoetp", "1234554321 abcde", "leddisplay", "vpnfirewall" and "batterycoolcharging" are respectively tagged with CID-1, CID-2, CID-3, CID-4, CID-5, CID-6 and CID-7. The filtered data include a string "123-455xxxbbbbla-bla-bla-blaa . . . dfafahkejljmoetpadjqer . . . gadfadfleddisplay . . . bsfgsg vpnfirewall . . . aabafterycollcharging". After being scanned by the content matching module 105, the contents "bla-bla-bla-bla", "hkejljmoetp", "leddisplay", "vpnfirewall" and "batterycoolcharging" can be found in the filtered data and the respective CIDs (CID-2, CID-3, CID-5, CID-6 and CID-7) are reported as matched CIDs to the first rule matching module 107.

As mentioned previously, the plurality of contents in the signature database 120 are organized into rules. To determine whether the rules are matched by the data stream 101, the first rule matching module 107 can trigger associated rules including the contents tagged with the matched CIDs for further inspection. For example, the content "abcdefg" constitutes a rule-1, the contents "bla-bla-bla-bla", "hkejljmoetp" and "vpnfirewall" constitute a rule-2, and the contents "bla-bla-bla-bla" and "1234554321abcde" constitute a rule-3. As such, the rule-1 is a simple rule and the rule-2 and rule-3 are complex rules. A CID representation of these rules is below:
Rule-1: CID-1; Rule-2: CID-2, CID-3, CID-6; Rule-3: CID-2, CID-4. As assumed previously, CID-2, CID-3, CID-5, CID-6 and CID-7 are reported as the matched CIDs. Consequently, the rule-2 and the rule-3, which include the contents tagged with the matched CIDs, are triggered for further inspection in the first rule matching module 107. However, the rule-1 is ignored by the first rule matching module 107 since the rule 1 does not include any content tagged with the matched CIDs. Furthermore, the first rule matching module 107 can be implemented as a state machine to detect whether all contents included in the triggered rules are found by the data stream 101 and to make a matching determination based on the detection, which will be described in detail in the following sections. As such, the first rule matching module 107 can make the matching determination that the rule-2 is matched by the data stream 101. However, the rule-3 is not matched since the data stream 101 does not include the content tagged with CID-4. In this way, the system 100 can scan the data stream 101 for a complex rule as efficiently as for a simple rule. Furthermore, the matching determination made by the first rule matching module 107 may be provided to the output module 107 for issuing the alarm or alert.

Furthermore, for a complex rule with multiple contents in the signature database 120, there may be additional requirements, such as a sequence requirement for setting an order for the multiple contents within the complex rule or a predetermined distance requirement for setting a distance constraint for the multiple contents within the complex rule. For a sequence requirement, the first rule matching module 107 can be configured to accept the matched CIDs from the content matching module 105 in a strict sequential order and still make the matching determination, which will be described in detail in the following sections. For a predetermined distance requirement, the second rule matching module 109 is specialized to address this constraint after the first rule matching module 107 has identified all the rules composed of the contents tagged with the matched CIDs. A more detailed description of the second rule matching module 109 will be represented in the following sections.

As can be concluded with reference to FIG. 1, the system 100 adopts a multi-stage approach by checking the data stream 101 step by step with different modules. In this way, each matched rule in the signature database 120 can be identified quickly such that system efficiency is enhanced. Also, the system 100 provides a sound solution for searching the data stream 101 for complex rules with multiple contents and additional requirements. Additionally, the signature database 120 can be easily modified or expanded since the signature database 120 resides in the SRAM or DRAM, which has a large memory size and is rewriteable. The SRAM or DRAM is a relatively cheap memory component. The system 100 can be implemented in an integrated logic circuit, for example, a FPGA or an application specific integrated circuit (ASIC) in the range of 100 k gates, which is very resource-effective. As such, the system 100 also has a relatively high flexibility and a relatively low cost.

Figure 2:
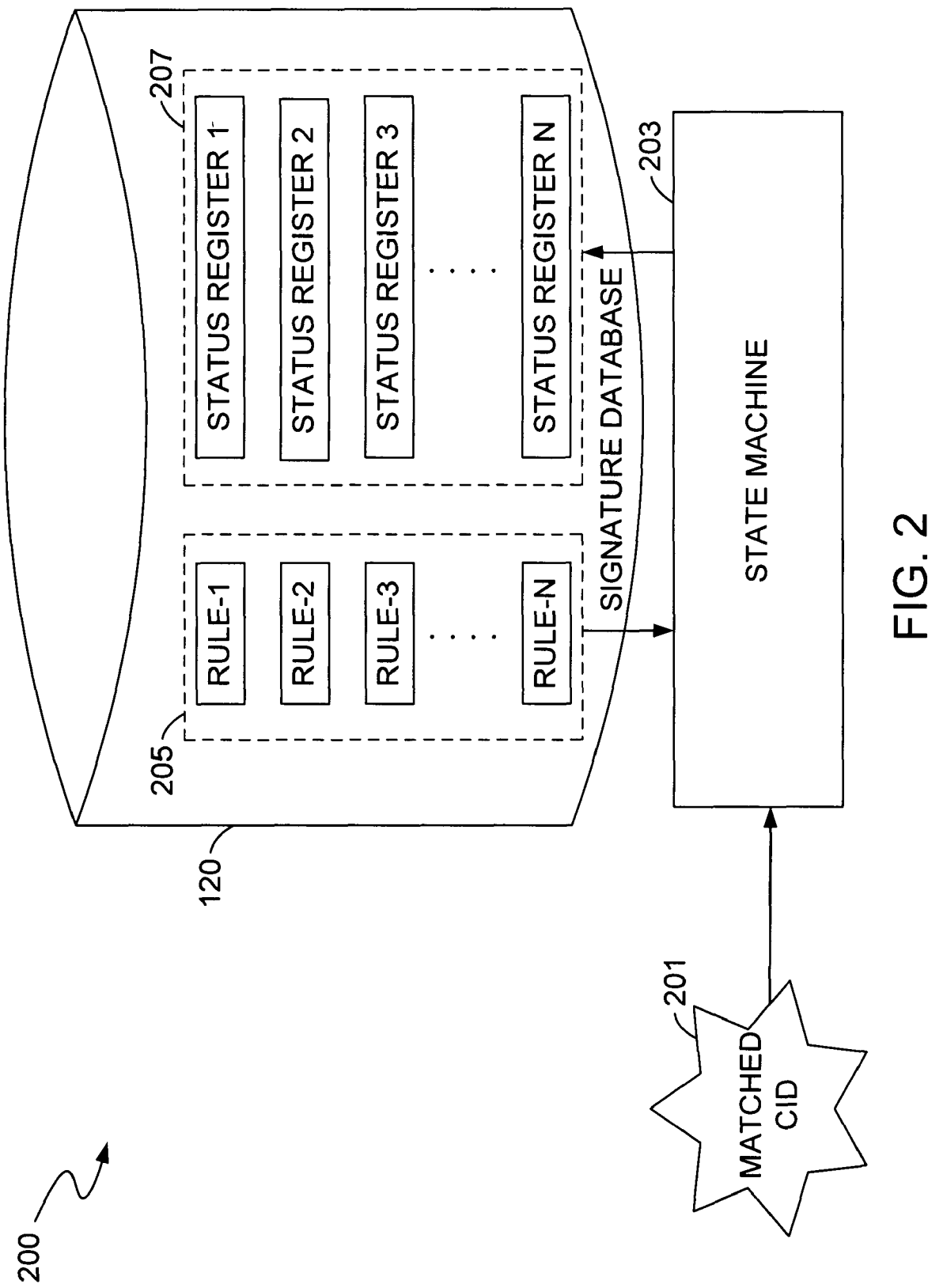
FIG. 2 is a block diagram of a first rule matching module according to one embodiment of the present invention.

FIG. 2 illustrates a block diagram of a first rule matching module 200 according to one embodiment of the present invention. Elements labeled the same as in FIG. 1 have similar functions and will not be described herein for purposes of brevity and clarity. The first rule matching module 200 is herein implemented as a state machine 203. The state machine 203 can determine whether the rules in the signature database 120 are matched according to the matched CIDs reported to the state machine 203. The matched CIDs are herein labeled as 201. Furthermore, the signature database 120 is divided into a rule block 205 and a status register block 207. The rule block 205 stores the rules, which have the CID representation as discussed above. The status register block 207 includes status registers corresponding to the rules for tracking a matching result of the rules. For example, a status register 1 corresponds to the rule-1 and tracks the matching result of the rule-1, a status register 2 corresponds to the rule-2 and tracks the matching result of the rule-2, a status register 3 corresponds to the rule-3 and tracks the matching result of the rule-3, and a status register N corresponds to a rule-N and tracks the matching result of the rule-N. Each status register has a number of bits. The number of bits is determined by a maximum content number owned by one of the rules.

In operation, the state machine 203 can trigger associated rules including the contents tagged with the matched CIDs for inspection. As assumed previously, the associated rule-1 and rule-2 which include matched CIDs are triggered for inspection by the state machine 203. Specifically, each bit of a respective status register is set to logic 1 or logic zero to indicate whether one of the contents within a respective rule is found in the data stream 101. According to the bit values of the respective status register, the state machine 203 can determine whether the respective rule is matched by the data stream 101.

Figure 3:
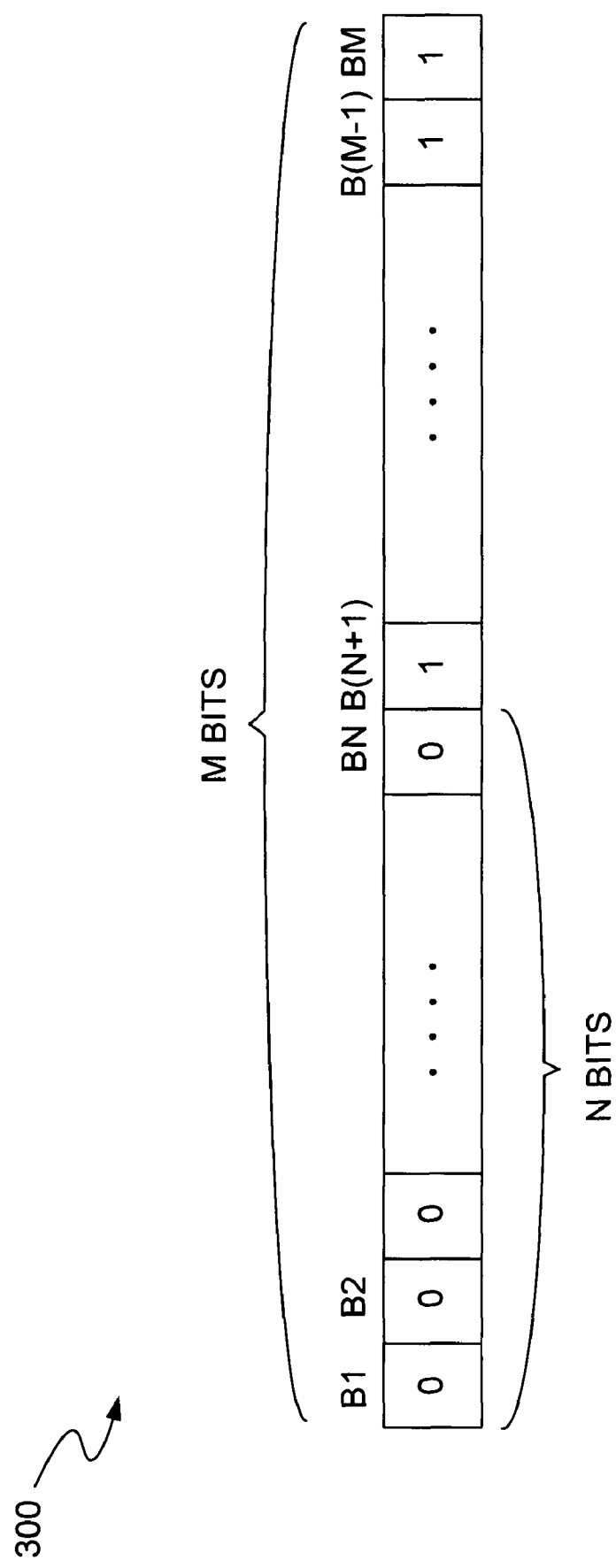
FIG. 3 is a structure diagram of a status register according to one embodiment of the present invention.

FIG. 3 illustrates a structure diagram of a status register 300 according to one embodiment of the present invention. FIG. 3 is described in combination with FIG. 2. The status register 300 has M bits, which indicates that one of the rules in the data stream 101 has the maximum content number M. In one embodiment, the left-most N bits indicate that the rule corresponding to the status register 300 is composed of N contents and each matching result of the N contents is tracked by one of the left-most N bits. In one embodiment, the left-most N bits are initialized to logic 0 while the remaining M-N bits are initialized to logic 1. For example, the rule corresponding to the status register 300 is referred to as rule-4, which is composed of 3 contents respectively tagged with CID-1, CID-3 and CID-5. As such, N is equal to 3. In operation, the left-most 3 bits are initialized to logic 0 while the remaining M−3 (M minus 3) bits are initialized to logic 1-bit 1 (B1) corresponds to CID-1, bit 2 (B2) corresponds to CID-3, and bit 3 (B3) corresponds to CID-5. As assumed previously, CID-3 and CID-5 are reported as matched CIDs. Consequently, bit 2 (B2) of the status register 300 is updated to logic 1. Similarly, bit 3 (B3) is also updated to logic 1. However, bit 1 (B1) is still logic 0 since CID-1 does not belong to the matched CIDs. Consequently, the state machine 203 can determine that the rule-4 is not matched by the data stream 101 since not all bits of the status register 300 are set to logic 1.

In addition, the N bits indicating the matching result of the contents can have various locations in the status register 300, instead of being limited to the left-most N bits. Also, the status register 300 can be initialized in a different way as long as the functions as described above can be realized.

Furthermore, when there is the sequence requirement as discussed above, the state machine 203 can be configured to accept the matched CIDs in a strict sequential order. For example, when the contents of the rule-4 are required to be in the order of CID-1, CID-3 and CID-5, the state machine 203 can be configured such that the left-most 3 bits of the status register 300 can be set to logic 1 only when the left-hand neighboring bit has already been set to logic 1. Advantageously, regardless of which sequence is required by the rules, the state machine 203 can choose a configuration to address the required sequence.

In one embodiment, assuming the maximum content number is 16, the status register 1 corresponding to rule-1 is initialized to 0111-1111-1111-1111 (from left-most B1 to right-most B16) because, in the example presented above, rule-1 contains a single CID(CID-1) and hence only a single bit (the left-most bit B1) is set to logic zero. Similarly, the status register 2 corresponding to rule-2 is initialized to 0001-1111-1111-1111 (from left-most B1 to right-most B16) because, in the example above, rule-2 contains three CIDs (CID-2, CID-3 and CID-6) and hence the three left-most bits B1-B3 are set to logic zero. In a similar manner, the status register 3 corresponding to rule-3 is initialized to 0011-1111-1111-1111 (from left-most B1 to right most-B16).

Assuming (by way of example) that the matched CIDs are accepted by the state machine 203 in the order of CID-3, CID-5, CID-2, CID-6 and CID-7, the state machine 203 will conduct the following operation sequentially. When CID-3 is accepted, the status register 2 will be updated to 0101-1111-1111-1111 because rule-2 includes CID-3, status register 2 corresponds to rule-2, and the second bit corresponds to CID-3; the status registers 1 and 3 will keep the previous values as 0111-1111-1111-1111 and 0011-1111-1111-111, respectively. In a similar manner, when CID-5 is accepted, the status registers 1, 2 and 3 will keep their previous values since CID-5 is not included in the corresponding rules. When CID-2 is accepted, the status registers 2 and 3 will be updated to 1101-1111-1111-1111 and 1011-1111-1111-1111, respectively, because CID-2 is included in both rule-2 and rule-3, corresponding to the first bits of the status registers 2 and 3; the status register 1 will keep the previous value as 0111-1111-1111-1111. When CID-6 is accepted, the status register 2 will be updated to 1111-1111-1111-1111, while the status registers 1 and 3 will keep their previous values as 0111-1111-1111-1111 and 1011-1111-1111-1111. When CID-7 is accepted, the status registers 1, 2 and 3 will keep their previous values since CID-7 is not included in the corresponding rules. When all matched CIDs are retrieved, the state machine 203 can determine whether the corresponding rules are matched by the data stream 101. For example, the state machine 203 can determine that the rule-2 is matched by the data stream 101 because all bits of the status register 2 are set to logic 1, while rule-1 and rule-3 are not matched by data stream 101 because not all bits of the status registers 1 and 3 are set to logic 1.

In one embodiment, the rule-2 can include an additional sequence requirement. For example, the contents in the rule-2 are predetermined in the order of CID-2, CID-3 and CID-6. In this instance, the state machine 203 can be configured such that B1, B2 and B3 of the status register 2 can be set to logic 1 only when the left-hand neighboring bit has already been set to logic 1. As such, in the example above, the state machine 203 can determine that the rule-2 is not matched by the data stream 101 because the status register 2 will be updated to 1001-1111-1111-1111 when CID-3 is firstly accepted, which does not satisfy the preset configuration of the state machine 203.

Referring back to FIG. 1, the signature database 120 may include a complex rule with multiple contents and the predetermined distance requirement. For example, a complex rule-5 in the signature database 120 may be as below:

Rule-5: "leddisplay", followed by "batterycoolcharging" exactly 50 characters away and then "bla-bla-bla-bla" not more than 20 characters away.

As assumed previously, "leddisplay", "batterycoolcharging" and "bla-bla-bla-bla" are respectively tagged with CID-5, CID-7 and CID-2. The CID representation of the complex rule-5 is as below:

Rule-5: CID-5, CID-7:=50, CID-2:<20.

To address the predetermined distance requirement, the content matching module 105 will not only report the matched CIDs to the first rule matching module 107 but also detect positions of the contents found in the data stream 101 and send the detected positions to the second rule matching module 109. As assumed previously, CID-2, CID-3, CID-5, CID-6 and CID-7 are reported as matched CIDs by the content matching module 105. Additionally, the content matching module 105 will also detect the positions of the contents tagged with CID-2, CID-3, CID-5, CID-6 and CID-7 in the data stream 101. As a result, the content matching module 105 will acquire the matched CIDs in combination with the positions. For example, the content matching module 105 acquires the information: CID-5: 25, CID-7: 75, CID-2: 100, CID-6: 125, CID-3: 130. This information indicates that CID-5, CID-7, CID-2, CID-6 and CID-3 are respectively found at position 25, 75, 100, 125 and 130 in the data stream 101.

As discussed above, after the data stream 101 goes through the first rule matching module 107, matching determinations associated with the rules without the predetermined distance requirement can be reported to the output module 130 directly. However, for the complex rule-5 with the predetermined distance requirement, the second rule matching module 109 will be initiated to check the distance between the multiple contents within the rule-5.

In this instance, the second rule matching module 109 will receive the positions of the multiple contents included in the complex rule-5 from the content matching module 105 to calculate a distance between these contents. For example, based on the positions of CID-5, CID-7 and CID-2, the second rule matching module 109 calculates that the distance between CID-5 and CID-7 is 50 characters and the distance between CID-7 and CID-2 is 25 characters. As such, the distance between the CID-7 and CID-2 does not satisfy the predetermined distance requirement of not more than 20 characters. Consequently, the second rule matching module 109 can make the matching determination that the complex rule-5 is not matched by the data stream 101.

Figure 4:
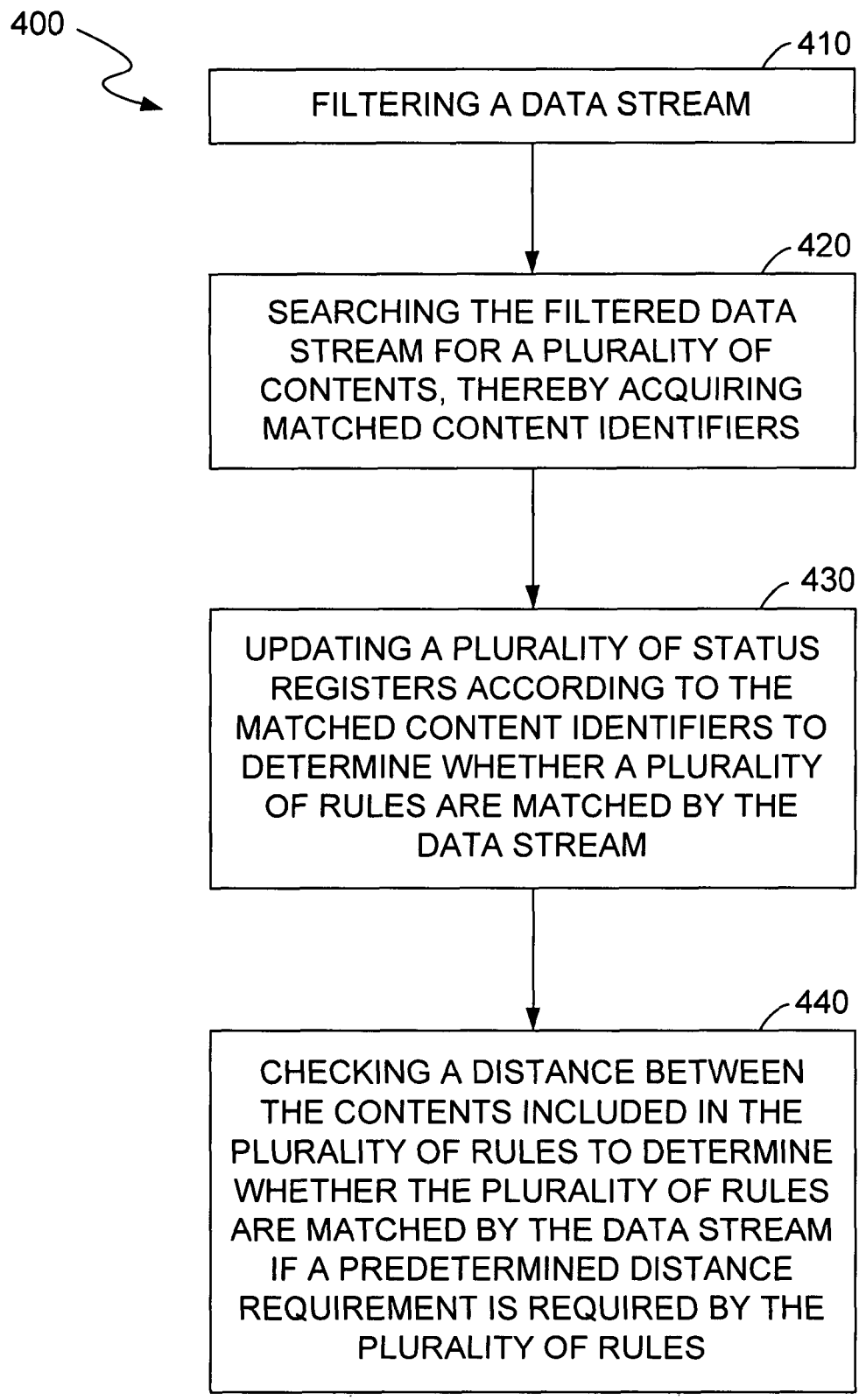
FIG. 4 is a flowchart of a method for performing a rule matching on a data stream according to one embodiment of the present invention.

FIG. 4 is a flowchart 400 of a method for performing a rule matching on a data stream according to one embodiment of the present invention. Although specific steps are disclosed in FIG. 4, such steps are exemplary. That is, the present invention is well suited to performing various other steps or variations of the steps recited in FIG. 4. FIG. 4 is described in combination with FIG. 1 and FIG. 2.

In block 410, a data stream is filtered to speed up the rule matching. In one embodiment, the data filtering module 103 can search the data stream 101 for string portions of the rules, thereby filtering the data stream 101 according to a result of the searching. The data filtering step is beneficial but not indispensable for the rule matching.

In block 420, the filtered data stream is searched for contents, thereby acquiring matched content identifiers. In one embodiment, the content matching module 105 can search the filtered data stream from the data filtering module 103 for a plurality of contents and report content identifiers of the contents found in the filtered data stream as matched content identifiers.

In block 430, status registers are updated according to the matched content identifiers to determine whether rules are matched by the data stream. In one embodiment, a first rule matching module 107 can be implemented as a state machine 203 to update status registers in the signature database 120 according to the matched content identifiers. Bit values of the status registers can determine whether the rules are matched by the data stream 101.

In block 440, a distance between the contents included in the rules is checked to determine whether the rules are matched by the data stream if a predetermined distance requirement is required by the rules. In one embodiment, the rules include simple rules with single content and complex rules with multiple contents. The complex rules can further include a predetermined distance requirement. In this instance, the second rule matching module 109 is employed to check the distance between the multiple contents. When the predetermined distance requirement is satisfied after the checking, the second rule matching module 109 can determine that the complex rules are matched by the data stream 101.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A storage medium having stored thereon computer-readable and computer-executable components to perform a rule matching on a data stream, comprising:
   a database comprising a plurality of status registers corresponding to associated with a plurality rules, a respective one of said status registers corresponding to a respective one of said rules, wherein said rules includes a plurality of contents, and wherein said respective status register has a plurality of bits, a respective one of said bits corresponding to a respective content of said respective rule;
   a content matching module operable for searching said data stream for a plurality of contents said contents; and
   a first rule matching module coupled to said content matching module and coupled to said status registers and operable for receiving matched contents found in said data stream and for updating said status registers according to said matched contents,
   wherein said rules include a simple rule with a single content selected from said contents and a complex rule with multiple contents selected from said contents, and
   wherein said respective status register indicates whether said respective rule is matched by said data stream.

2. The storage medium of claim 1, further comprising:
   a data filtering module coupled to said content matching module for searching said data stream for string portions of said plurality of rules and filtering said data stream according to a result of said searching before said data stream is searched for said plurality of contents by said content matching module.

3. The storage medium of claim 2, wherein said string portions are compressed to a hashed string portion and said data stream is searched for said hashed string portion.

4. The storage medium of claim 1, wherein said plurality of contents are tagged with a plurality of content identifiers respectively, and wherein associated rules are triggered for inspection according to matched content identifiers, said matched content identifiers representing the contents found in said data stream.

5. The storage medium of claim 1, wherein said first rule matching module is implemented as a state machine.

6. The storage medium of claim 1, wherein said complex rule has a sequence requirement for said multiple contents, and wherein said first rule matching module checks whether a sequence of finding said multiple contents of said complex rule in said data stream satisfies said sequence requirement and determines whether said complex rule is matched by said data stream according to a result of said checking.

7. The storage medium of claim 1, wherein said complex rule has a predetermined distance requirement for said multiple contents.

8. The storage medium of claim 7, further comprising:
a second rule matching module coupled to said first rule matching module for checking whether a distance between positions of said multiple contents of said complex rule in said data stream satisfies said predetermined distance requirement, and for determining whether said complex rule is matched by said data stream according to a result of said checking.

9. The storage medium of claim 8, wherein said content matching module detects said positions of said multiple contents in said data stream, and wherein said second rule matching module is coupled to said content matching module for receiving said positions and for calculating said distance between said positions.

10. The storage medium of claim 1, wherein said storage medium is implemented in hardware selected from the group consisting of a programmable gate array (FPGA) and an application specific integrated circuit (ASIC).

11. The storage medium of claim 1, wherein said plurality of contents are stored in a memory component selected from the group consisting of a static random access memory (SRAM) and a dynamic random access memory (DRAM).

12. The apparatus of claim 1, wherein said bits of said respective status register are updated sequentially bit by bit in a sequence of finding contents of said respective rule in said data stream.

13. The method of claim 1, wherein said rules comprise a complex rule having multiple contents and a sequence requirement for said multiple contents, and wherein a first bit in a status register which corresponds to a first content of said complex rule is forbidden from update if a second bit in said status register indicates that no matching is found between said data stream and a second content which precedes said first content in said complex rule according to said sequence requirement.

14. A method for performing a rule matching on a data stream, comprising:
searching said data stream for a plurality of contents;
updating a plurality of status registers according to matched contents found in said data stream, wherein a respective one of said status registers corresponds to a respective one of a plurality of rules, wherein said rules includes said contents, and wherein said respective status register has a plurality of bits, a respective one of said bits corresponding to a respective content of said respective rule; and
determining whether said respective rule is matched by said data stream according to said respective status register,
wherein said rules include a simple rule with a single content selected from said contents and a complex rule with multiple contents selected from said contents.

15. The method of claim 14, further comprising:
searching said data stream for string portions of said plurality of rules; and
filtering said data stream according to a result of said searching before searching said data stream for said plurality of contents.

16. The method of claim 15, further comprising:
compressing said string portions to a hashed string portion; and
searching said data stream for said hashed string portion.

17. The method of claim 14, further comprising:
tagging said plurality of contents respectively with a plurality of content identifiers;
reporting one of said plurality of content identifiers as a matched content identifier, wherein the content tagged with said matched content identifier is found in said data stream; and
triggering associated rules for inspection according to said matched content identifier.

18. The method of claim 14, further comprising:
sequentially finding said multiple contents of said complex rule in said data stream;
checking whether a sequence of said finding satisfies a sequence requirement for said multiple contents of said complex rule; and
determining where said complex rule is matched by said data stream according to a result of said checking.

19. The method of claim 14, wherein said complex rule has a predetermined distance requirement for said multiple contents.

20. The method of claim 19, further comprising:
checking whether a distance between positions of said multiple contents of said complex rule in said data stream satisfies said predetermined distance requirement; and
determining whether said complex rule is matched by said data stream according to a result of said checking.

21. The method of claim 20, further comprising:
detecting said positions of said multiple contents in said data stream; and
calculating said distance between said positions.

22. A system for performing a rule matching on a data stream, comprising:
a signature database having a rule block and a status register block, said rule block storing a plurality of rules comprised of a plurality of contents, said status register block including a plurality of status registers associated with said rules, wherein a respective one of said status registers corresponds to a respective one of said rules, and wherein said respective status register has a plurality of bits, a respective one of said bits corresponding to a respective content of said respective rule; and
a matching engine coupled to said signature database and operable for searching said data stream for said plurality of contents, and for updating said status registers according to matched contents found in said data stream,
wherein said respective status register indicates whether said respective rule is matched by said data stream.

23. The system of claim 22, wherein said signature database resides in a memory component selected from the group consisting of a static random access memory (SRAM) and a dynamic random access memory (DRAM).

24. The system of claim 22, wherein said matching engine is implemented in hardware selected from the group consisting of a field programmable gate array (FPGA) and an application specific integrated circuit (ASIC).

25. The system of claim 22, further comprising:
a data filtering module for searching string portions of said plurality of rules and filtering said data stream according to a result of said searching before said data stream is searched for said plurality of contents by said matching engine.

26. The system of claim 22, wherein said plurality of rules include a complex rule with multiple contents and a predetermined distance requirement, and wherein said matching engine further comprises a first rule matching module and a second rule matching module, said first rule matching module determining whether said complex rule is matched by said data stream by checking whether said multiple contents are found in said data stream and said second rule matching module determining whether said complex rule is matched by said data stream by checking whether a distance between positions of said multiple contents in said data stream satisfies said predetermined distance requirement.

27. The system of claim 22, wherein said plurality of rules include a complex rule with multiple contents and a sequence requirement for said multiple contents, and wherein said matching engine determines whether said complex rule is matched by said data stream by checking whether a sequence of finding said multiple contents in said data stream satisfies said sequence requirement.

* * * * *